D. Howarth.
Refrigerator.
N°. 91,021.    Patented Jan. 8, 1869.
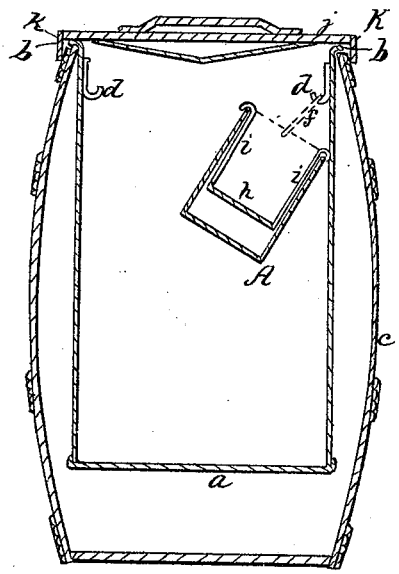
Witnesses
Henry C. Houston
Wm Franklin Leavey
Inventor
David Howarth
Per Wm H Clifford Atty

United States Patent Office.

DAVID HOWARTH, OF PORTLAND, MAINE.

Letters Patent No. 91,021, dated June 8, 1869.

IMPROVED REFRIGERATOR.

The Schedule referred to in these Letters Patent and making part of the same.

*To all whom it may concern:*

Be it known that I, DAVID HOWARTH, of Portland, in the county of Cumberland, and State of Maine, have invented a new and useful Improved Refrigerator; and I hereby declare the following to be a full, clear, and exact description thereof, which will enable others to make and use my invention, reference being had to the accompanying drawings, forming part of this specification, in which is shown a side sectional elevation of my invention, and a detail of the ice-receptacle at A'.

The purpose of my invention is to provide a cheap and efficacious refrigerator.

To effect this, I construct a cylinder, of the proper material, (see $a$,) open at one end, and closed at the other, with lips, or flanges, $b$, at the open end. My purpose is to make this of the size necessary to fit any barrel of common construction, to wit, a flour-barrel, illustrated at $c$.

The said cylinder does not reach the bottom of said barrel, but is held by its lips $b$ overlapping the top edge of the barrel, as shown.

On the interior of this cylinder $a$, I affix hooks, $d$, which may be turned round flat against the interior of said cylinder when such hooks are not required for use.

A shows the ice-receptacle, which is a common pail, with its bail, $f$, to hook over one of the hooks $d$.

This pail contains a shelf, $h$, held at some distance above the bottom of the pail or receptacle, by hooked arms, $i$, hooking over the upper edges of the pail. This shelf $i$ holds the ice, and the drippings fall into the bottom of the pail.

$j$ is the cover, with lips, $k$, to overlap the top edge of the barrel, and having a number of holes in it, for ventilation.

The hooks $d$ can be used to suspend any article of food, &c., from, besides holding the ice-receptacle.

The bottom of the cylinder is also dry, and thus can be used to receive any articles placed thereon, without injury to such articles.

The cylinder can be quickly removed for cleansing, not being attached to anything.

The purchaser need only buy the cylinder and its ice-receptacle and cover, and then fit them to a barrel of the proper size.

Thus a cheap and useful article is furnished, and one within the reach of many who could not otherwise purchase any refrigerator.

The ice-shelf $h$ is removable for any purpose, such as cleansing it, &c., as is also the receptacle A, for the purpose of emptying away the water from the ice.

What I claim as my invention, and desire to secure by Letters Patent, is—

A refrigerator, composed of the described arrangement of the cylinder $a$, the ice-receptacle A, with its shelf, $h$, the hooks $d$, and perforated cover $j$, the said cylinder to be placed in an ordinary barrel, and there held by the lip or flange on said cylinder, for the purposes specified.

DAVID HOWARTH.

Witnesses:
WILLIAM HENRY CLIFFORD,
WM. FRANKLIN SEAVEY.